United States Patent [19]
Morimoto

[11] Patent Number: 6,091,692
[45] Date of Patent: Jul. 18, 2000

[54] OPTICAL INFORMATION STORAGE APPARATUS

[75] Inventor: Yasuaki Morimoto, Kawasaki, Japan

[73] Assignee: Fujitsu Limited, Kawasaki, Japan

[21] Appl. No.: 09/049,796

[22] Filed: Mar. 27, 1998

[30] Foreign Application Priority Data

Oct. 6, 1997 [JP] Japan ..................................... 9-272865
Mar. 11, 1998 [JP] Japan ................................... 10-060067

[51] Int. Cl.⁷ ...................................................... G11B 7/00
[52] U.S. Cl. ........................ 369/112; 369/110; 369/44.23
[58] Field of Search ........................... 369/44.23, 44.24, 369/44.41, 112, 110, 109

[56] References Cited

U.S. PATENT DOCUMENTS

| | | | |
|---|---|---|---|
| 5,392,274 | 2/1995 | Sofue | 369/44.23 |
| 5,488,598 | 1/1996 | Endo et al. | 369/44.23 |
| 5,490,013 | 2/1996 | Shimizu et al. | 359/637 |
| 5,508,992 | 4/1996 | Hirose et al. | 369/110 |
| 5,550,798 | 8/1996 | Hineno et al. | 369/44.23 |
| 5,559,767 | 9/1996 | Matsui | 369/44.23 |
| 5,559,783 | 9/1996 | Ishika | 369/44.23 |
| 5,933,401 | 8/1999 | Lee et al. | 369/44.23 |

FOREIGN PATENT DOCUMENTS

| | | |
|---|---|---|
| 61-184740 | 8/1986 | Japan . |
| 61-271633 | 12/1986 | Japan . |
| 62-9537 | 1/1987 | Japan . |
| 255305 | 2/1988 | Japan . |
| 63-129529 | 6/1988 | Japan . |
| 1-277711 | 11/1989 | Japan . |
| 5-151643 | 6/1993 | Japan . |
| 6-68540 | 3/1994 | Japan . |
| 7-50018 | 2/1995 | Japan . |
| 7-182713 | 7/1995 | Japan . |
| 8115524 | 5/1996 | Japan . |

*Primary Examiner*—Nabil Hindi
*Attorney, Agent, or Firm*—Greer, Burns & Crain, Ltd.

[57] ABSTRACT

An optical information storage apparatus is constructed to include a light source, a polarization beam splitter reflecting light emitted from the light source and irradiating a reflected light on a recording surface of a recording medium, and an optical element, made of an optically transparent material, having an input surface to which light reflected by the recording surface and transmitted through the polarization beam splitter is input, and an output surface from which light is output. The optical element is inclined within a plane which is perpendicular to a light incident surface of the polarization beam splitter and includes an optical axis along which light travels. In addition, the input surface and the output surface of the optical element are parallel to each other.

6 Claims, 11 Drawing Sheets

OPTICAL INFORMATION STORAGE APPARATUS

BACKGROUND OF THE INVENTION

The present invention generally relates to optical information storage apparatuses, and more particularly to an optical information storage apparatus which is suited for reproducing high-quality magneto-optic signals from a recording medium.

In this specification, an "information storage apparatus" refers to an apparatus which records information to and/or reproduces information from a recording medium.

In an optical information storage apparatus, a light beam emitted from a light source is reflected by a plate-shaped polarization beam splitter and irradiated on a recording surface of an optical recording medium. The light beam which is reflected by the recording surface of the optical recording medium passes through the plate-shaped polarization beam splitter and is directed towards a photodetector. An astigmatism is generated when the reflected light beam from the optical recording medium passes through the plated shaped polarization beam splitter. In a compact disk player which reproduces a signal from a compact disk (CD), for example, this astigmatism is used to generate a focal error signal.

FIG. 1 is a plan view showing the general construction of an example of an optical system of the CD player. In FIG. 1, a light beam emitted from a semiconductor laser 14 is input to a diffraction grating 15, and ±1st order lights which are sub light 15 beams used to detect a tracking error are generated. The light beam passing through the diffraction grating is subjected to an amplitude division by a semitransparent mirror 16, and is reflected by the semitransparent mirror 16 depending on a reflectivity of the semitransparent mirror 16 and then input to a collimator lens 17. The collimator lens 17 converts the incoming light beam into parallel rays. The parallel rays from the collimator lens 17 are reflected in a direction perpendicular to the paper in FIG. 1 by a mirror 18 and reach an objective lens 19 which stops the rays to a diffraction limit, thereby irradiating a pit 21 provided on the CD. In FIG. 1, an arrow 20 indicates a direction of an electric vector of the light irradiated on the CD. In the case of the CD, the direction 20 of the electric vector of the light irradiated on the CD is not very important, but this direction 20 is set to a 45° direction with respect to a row of the pits 21.

The light reflected by the pit 21 is again input to the objective lens 19, and is passed through the collimator lens 17 to become a convergent light. This convergent light is subjected to an amplitude division by the semitransparent mirror 16, and is transmitted through the semitransparent mirror 16 depending on a transmittance of the semitransparent mirror 16. The light transmitted through the semitransparent mirror 16 generates an astigmatism and a coma aberration. The coma aberration is eliminated and only the astigmatism is extracted from the light transmitted through the semitransparent mirror 16, by passing the light from the semitransparent mirror 16 through a plano-concave lens 22 which is inclined in a direction opposite to the inclination of the semitransparent mirror 16. The light which passes through the plano-concave lens 22 is detected by a photodetector 23a, and a radio frequency (RF) signal, a focal error signal and a tracking error signal are generated based on an output of the photodetector 23a.

FIG. 2 is a plan view showing the general construction of the photodetector 23a on an enlarged scale. The photodetector 23a includes a 4-part detector 24a which is made up of detector parts A, B, C and D, a detector 25a, and a detector 26a. The RF signal is generated from a sum A+B+C+D of output photocurrents A, B, C and D of the detector parts A, B, C and D of the 4-part detector 24a. The focal error signal is generated from a difference between a sum A+C of the output photocurrents A and C of the detector parts A and C of the 4-part detector 24a, and a sum B+D of the output photocurrents B and D of the detector parts B and D of the 4-part detector 24a.

The tracking error signal is generated from a difference between an output photocurrent of the detector 25a and an output photocurrent of the detector 26a. A push-pull signal which appears in a radial direction of the CD depending on the row of the pits 21 provided on the CD is generated in a direction indicated by an arrow in FIG. 2. This push-pull signal is not used as a tracking error signal.

As shown in FIG. 1, the CD player is designed so that the direction in which the astigmatism is generated is inclined by approximately 45° with respect to a direction in which the signal of the CD flows. This design is employed because the push-pull signal appears in the radial direction of the CD due to the diffraction phenomenon when a spot of the light beam which is stopped to the diffraction limit is irradiated on the pit 21 of the CD. A frequency of this push-pull signal is determined by an amount of decentering, a rotational speed and a track pitch of the CD. A frequency band of the push-pull signal is approximately the same as a frequency band of the focal error signal which is obtained by the astigmatism method.

On the other hand, FIG. 3 is a diagram showing a case where a direction in which the astigmatism is generated in the CD player is parallel to a direction in which the signal of the CD flows. In addition, FIG. 4 is a plan view showing the general construction of a photodetector 23b. In FIG. 3, those parts which are the same as those corresponding parts in FIG. 1 are designated by the same reference numerals, and a description thereof will be omitted.

In this case, the tracking error signal is generated from a difference between output photocurrents of detectors 25b and 26b of the photodetector 23b, and no inconvenience is introduced. However, detector parts A through D of a 4-part detector 24b that are used to generate the focal error signal must be arranged as shown in FIG. 4. Accordingly, the direction in which the astigmatism is generated becomes parallel or perpendicular to the direction in which the push-pull signal is generated, and division lines (dark lines) of the 4-part detector 24b are inclined by 45° with respect to the direction in which the push-pull signal is generated. For this reason, the push-pull signal easily mixes into the focal error signal as a crosstalk, and a stable focal error signal cannot be obtained.

In the case of a recording medium, such as the CD, exclusively for use when reproducing signals from the recording medium, no inconvenience is introduced regardless of the polarization direction of the light beam irradiated on the recording medium.

In the case of a magneto-optic recording medium, the polarization direction of the light beam irradiated on the recording surface of the magneto-optic recording medium at the time of the signal reproduction is extremely important. Generally, it is known that the noise is reduced when the polarization direction of the light beam is parallel or perpendicular to a tracking guide groove which is provided on the magneto-optic recording medium. This noise reduction is due to the birefringence of a substrate and the shape of the groove of the magneto-optic recording medium. Accordingly, in the case of the optical information storage apparatus which reproduces the signal from the magneto-optic recording medium, there was a problem in that the push-pull signal will mix into a focal error signal as a crosstalk if an attempt is made to generate the focal error signal by the astigmatism method using a plate-shaped polarization beam splitter as in the case of the CD player shown in FIG. 3, and that it is extremely difficult to generate a stable tracking error signal. On the other hand, in the case of the magneto-optic recording medium, there was a dilemma in that it is extremely important to make the polarization direction of the light beam irradiated on the recording surface parallel or perpendicular with respect to the groove of the magneto-optic recording medium.

SUMMARY OF THE INVENTION

Accordingly, it is a general object of the present invention to provide a novel and useful optical information storage apparatus in which the problems described above are eliminated.

Another and more specific object of the present invention to provide an optical information storage apparatus which can generate a stable focal error signal and a tracking error signal, and detect a high-quality magneto-optic signal, using a relatively simple and inexpensive structure.

Still another object of the present invention is to provide an optical information storage apparatus comprising a light source, a polarization beam splitter reflecting light emitted from the light source and irradiating a reflected light on a recording surface of a recording medium, and an optical element, made of an optically transparent material, having an input surface to which light reflected by the recording surface and transmitted through the polarization beam splitter is input, and an output surface from which light is output, where the optical element is inclined within a plane which is perpendicular to a light incident surface of the polarization beam splitter and includes an optical axis along which light travels, and the input surface and the output surface of the optical element are parallel to each other. According to the optical information storage apparatus of the present invention, it is possible to generate a stable focal error signal and a tracking error signal, and to detect a high-quality magneto-optic signal, using a relatively simple and inexpensive structure.

Other objects and further features of the present invention will be apparent from the following detailed description when read in conjunction with the accompanying drawings.

DESCRIPTION OF THE PREFERRED EMBODIMENTS

Figure 1:
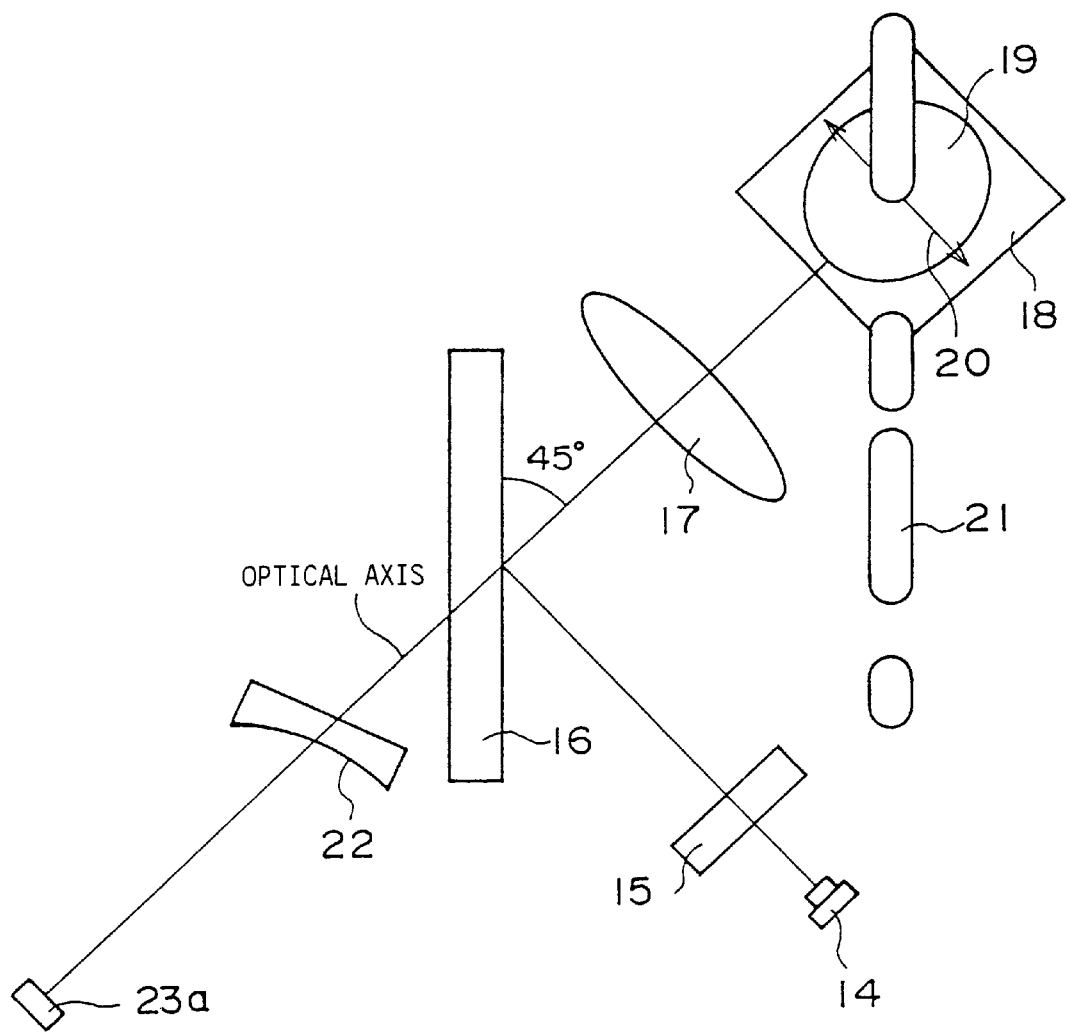
FIG. 1 is a plan view showing the general construction of an example of an optical system of a CD player.
Figure 2:
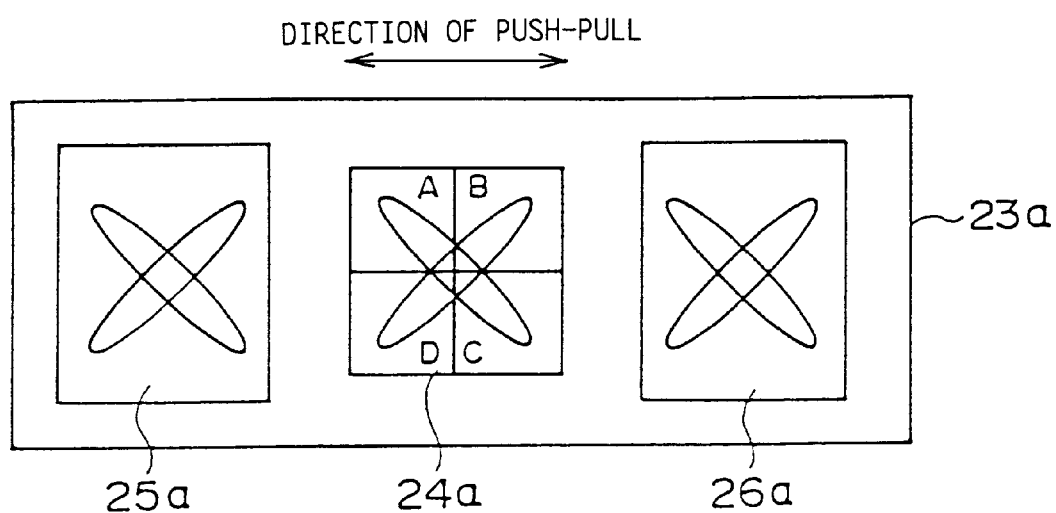
FIG. 2 is a plan view showing the general construction of a photodetector on an enlarge scale.
Figure 3:
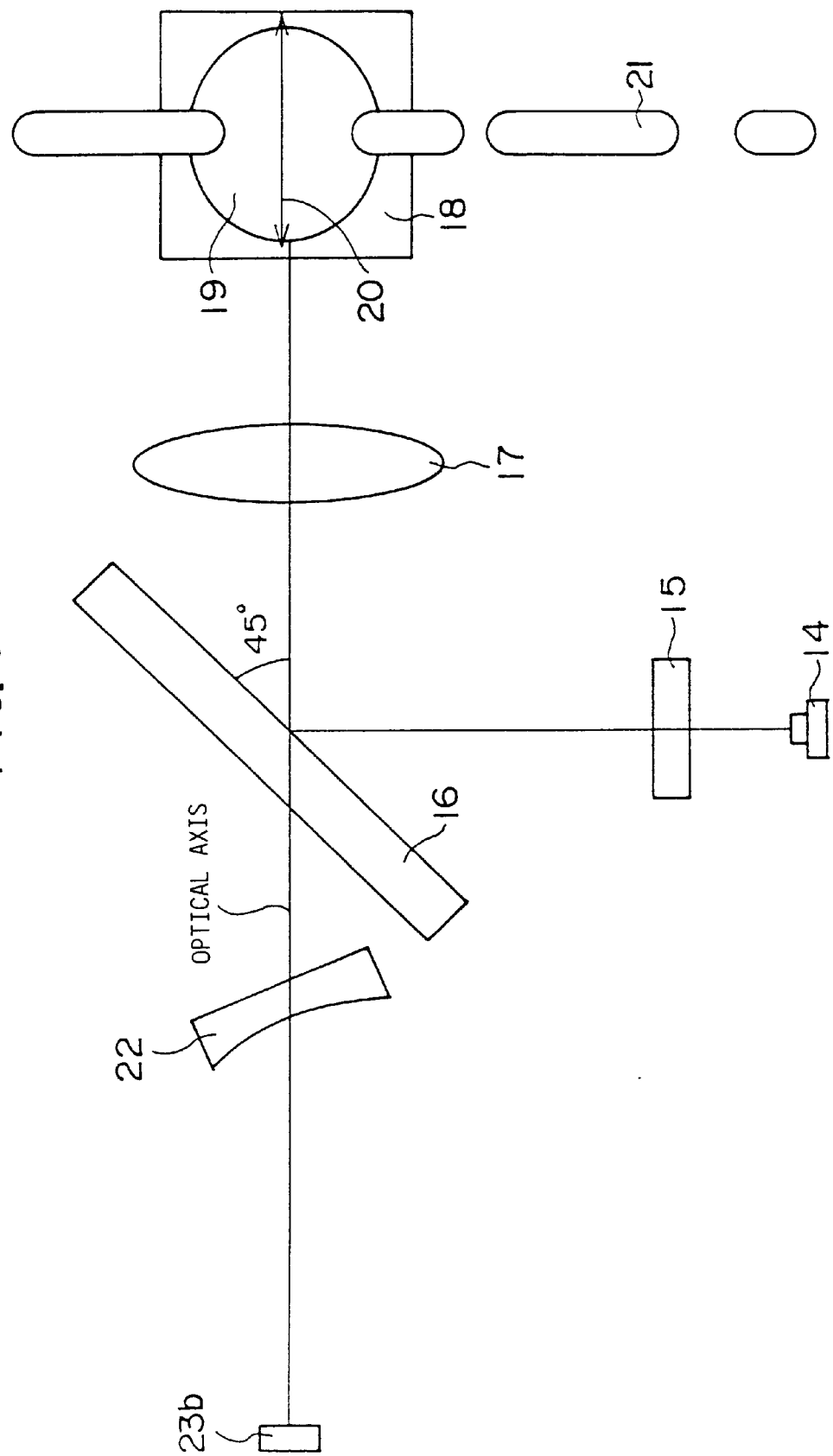
FIG. 3 is a diagram showing a case where a direction in which an astigmatism is generated in the CD player is parallel to a direction in which a signal of a CD flows.
Figure 4:
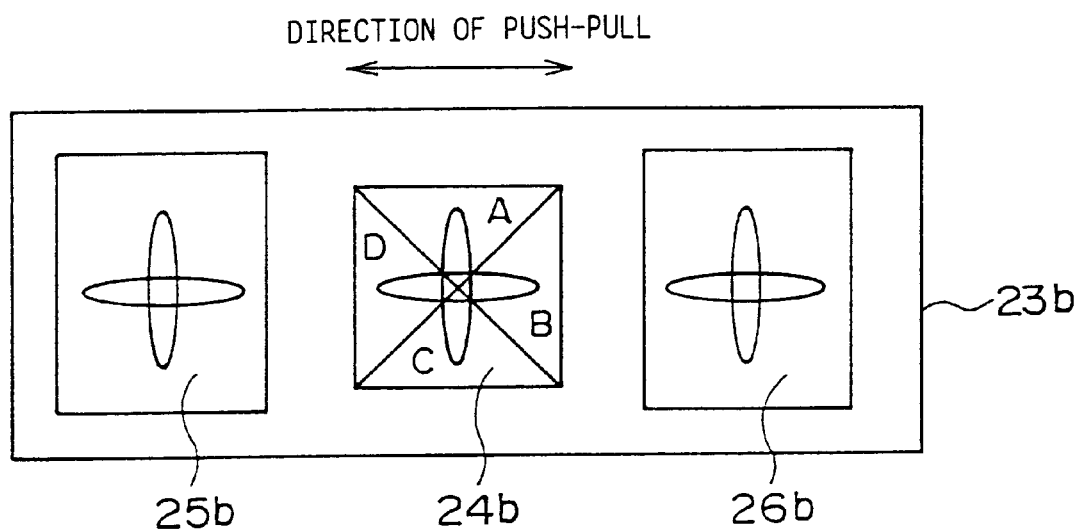
FIG. 4 is a plan view showing the general construction of a photodetector.
Figure 5:
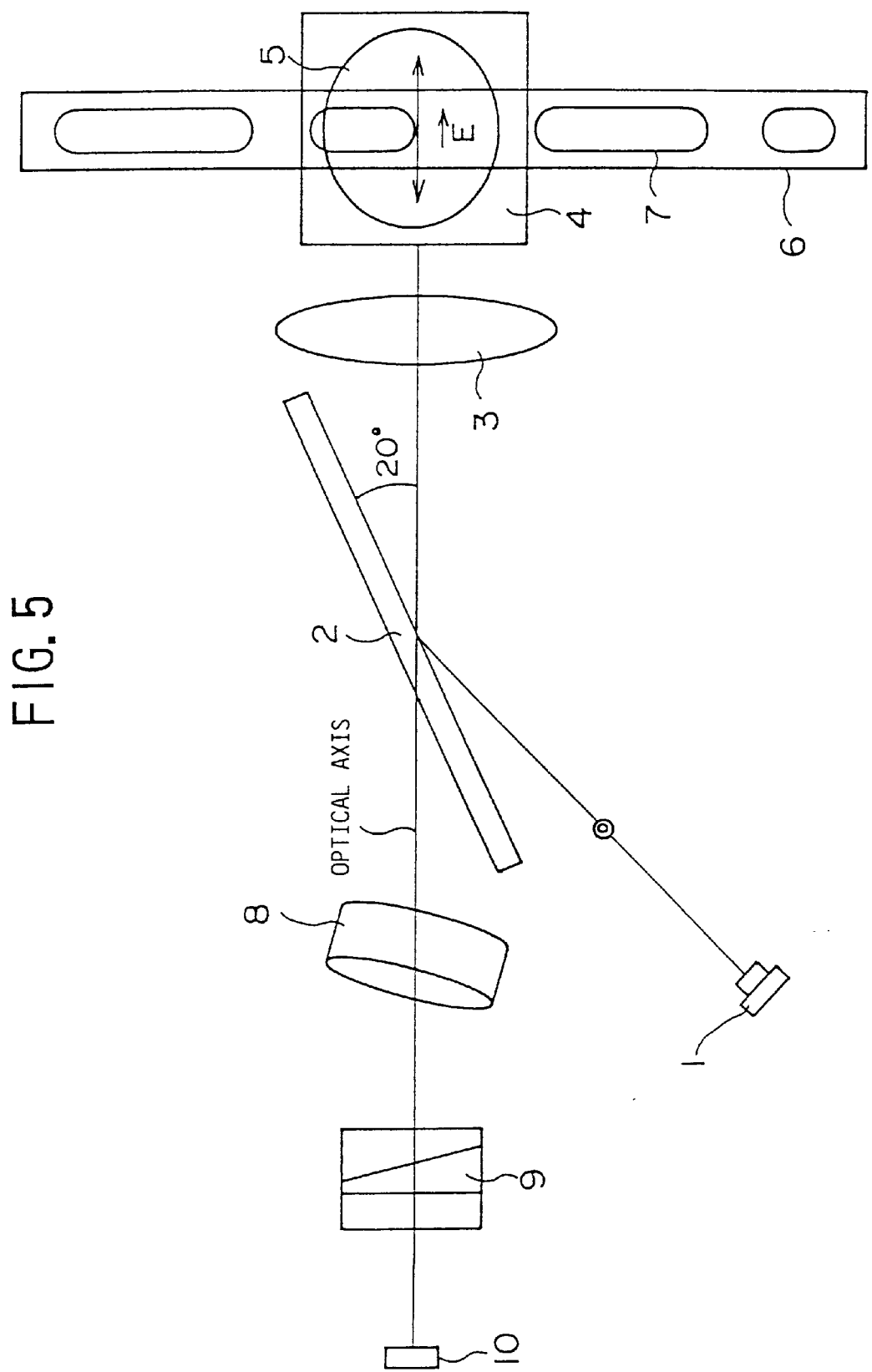
FIG. 5 is a plan view showing the general construction of an optical system of a first embodiment of an optical information storage apparatus according to the present invention.

FIG. 5 is a plan view showing the general construction of an optical system of a first embodiment of an optical information storage apparatus according to the present invention. In FIG. 5, a light beam emitted from a semiconductor laser 1 has an electric vector (S-polarized component) perpendicular to the paper in FIG. 5, and in this embodiment, this light beam is reflected by a plate-shaped polarization beam splitter 2 which is inclined by 20° with respect to an optical axis of the optical system. The plate-shaped polarization beam splitter 2 is made of a plate-shaped glass provide with a layer for making the polarization beam splitting. In a desirable arrangement of the plate-shaped polarization beam splitter 2, the plate-shaped polarization beam splitter 2 is inclined by approximately 20° to approximately 35° with respect to the optical axis of the optical system. A polarization reflection characteristic of the plate-shaped polarization beam splitter 2 is set to satisfy Tp:Rp=80:20 and Ts:Rs=20:80, where Tp denotes the transmittance with respect to the P-polarized component, Ts denotes the transmittance with respect to the S-polarized component, Rp denotes the reflectivity with respect to the P-polarized component, and Rs denotes the reflectivity with respect to the S-polarized component. The light beam reflected by the plate-shaped polarization beam splitter 2 is converted into parallel rays by a collimator lens 3. The parallel rays are reflected by a mirror 4 and directed to an objective lens 5 which stops the rays to a diffraction limit. The light obtained via the objective lens 5 is irradiated on a land or a groove forming a track 6 on a magneto-optic disk, and a magnetic domain 7 is recorded or, a magnetic domain 7 on the track 6 is reproduced. In FIG. 5, a direction of an electric vector of the light irradiated on the magneto-optic disk is indicated by an arrow E. This direction. E of the electric vector is set perpendicular to a direction in which the track 6 extends. If the entire optical system is rotated by 90°, it is also possible to set the direction of the electric vector of the light irradiated on the magneto-optic disk to become parallel to the direction in which the track 6 extends.

A reflected light in which the plane of polarization has rotated due to the magnetic Kerr effect is again directed to the objective lens 5, from the magneto-optic disk, and becomes a convergent light by passing through the collimator lens 3. This convergent light is input to the plate-shaped polarization beam splitter 2, and is transmitted through the plate-shaped polarization beam splitter 2 depending on the polarization characteristic described above. The light transmitted through the plate-shaped polarization beam splitter 2 generates an astigmatism and a coma aberration. This light transmitted through the plate-shaped polarization beam splitter 2 is input to a plano concave lens 8 having a concave surface on one side thereof.

The plano concave lens 8 is inclined in an in-plane direction positioned at 45° from a plane which is perpendicular to the light incident surface (surface parallel to the paper) of the plate-shaped polarization beam splitter 2 and includes an optical axis along which the light travels. For this reason, an astigmatism is newly generated by the plano concave lens 8. The astigmatism generated by the plano concave lens 8 appears in a plane perpendicular to the optical axis, in a 45° direction from the paper and in a direction perpendicular to this 45° direction. The light passing through the plano concave lens 8 reaches a Wollaston prism 9 which is made of optical crystals.

The Wollaston prism 9 is inclined in the in-plane direction of the plane which is perpendicular to the paper and includes the optical axis, and eliminates the astigmatism generated by the plate-shaped polarization beam splitter 2. Because the inclination directions of the plate-shaped polarization beam splitter 2 and the Wollaston prism 9 are perpendicular to each other, the polarities of the astigmatisms become opposite to each other, thereby mutually cancelling the astigmatisms. In other words, if the direction perpendicular to the paper is regarded as being the positive polarity, the direction parallel to the paper and perpendicular to the optical axis is regarded as being the negative polarity. Accordingly, the astigmatism used to generate a focal error signal is dependent on only the function of the plano concave lens 8, and this plano concave lens 8 is inclined in the in-plane direction positioned at 45° from the plane which is perpendicular to the light incident surface (surface parallel to the paper) of the plate-shaped polarization beam splitter 2 and includes the optical axis along which the light travels.

Figure 6:
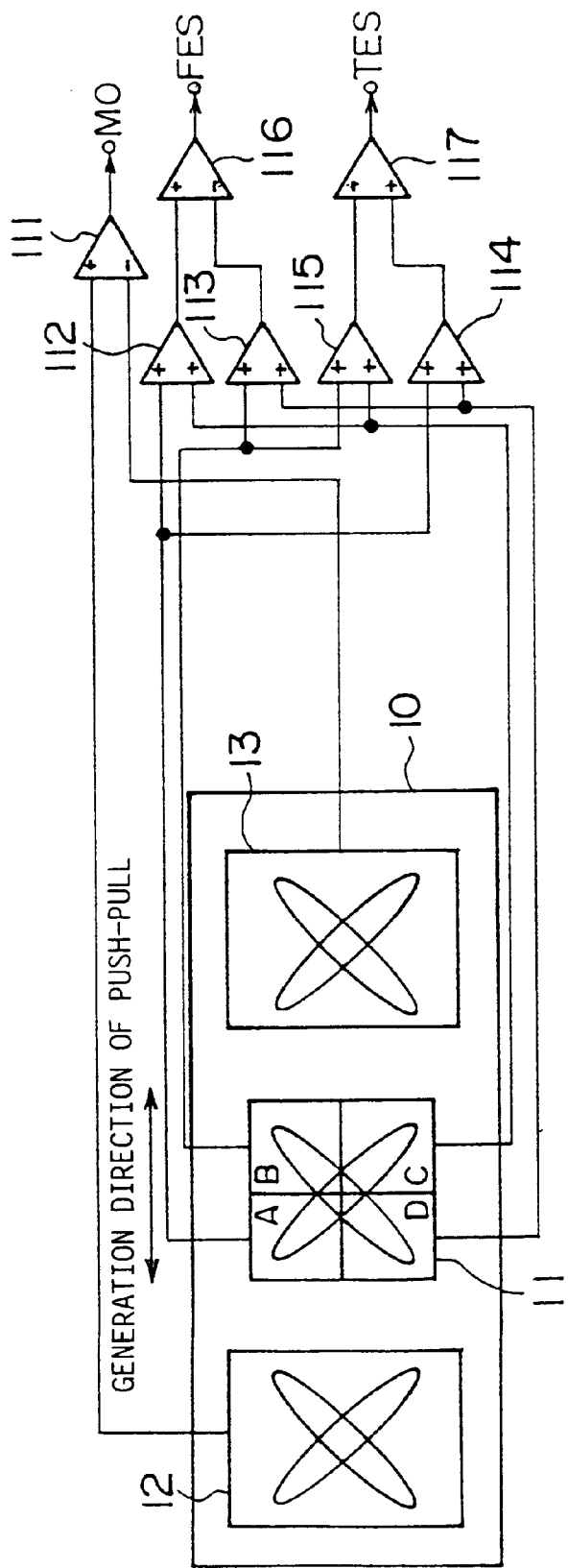
FIG. 6 is a diagram showing the general construction of a photodetector together with a signal reproducing system.

FIG. 6 is a diagram showing the general construction of a photodetector 10 together with a signal reproducing system. The photodetector 10 includes a 4-part detector 11 made up of detector parts A, B, C and D, a detector 12, and a detector 13. A magneto-optic signal (MO) is generated from a differential amplifier 111 which obtains a difference between output currents of the detectors 12 and 13. A focal error signal (FES) is generated by a differential amplifier 116 which obtains a difference (A+C)–(B+D) between an output (A+C) of an operational amplifier 112 which obtains a sum of output photocurrents A and C of the detector parts A and C of the 4-part detector 11 and an output (B+D) of an operational amplifier 113 which obtains a sum of output photocurrents B and D of the detector parts B and D of the 4-part detector 11. A tracking error signal (TES) is generated by a differential amplifier 117 which obtains a difference (A+D)–(B+C) between an output (A+D) of an operational amplifier 114 which obtains a sum of output photocurrents A and D of the detector parts A and D of the 4-part detector 11 and an output (B+C) of an operational amplifier 115 which obtains a sum of output photocurrents B and C of the detector parts B and C of the 4-part detector 11.

As shown in FIG. 6, the direction of the astigmatism is inclined by 45° with respect to a direction in which the push-pull signal is generated depending on the diffraction phenomenon caused by the groove provided on the magneto-optic disk. In other words, division lines (dark lines) of the 4-part detector 11 can be arranged in a direction parallel to the groove or in a direction perpendicular to the groove. For this reason, the mixing of the push-pull signal into the focal error signal (FES) as a crosstalk is suppressed, and it is possible to generate a stable focal error signal (FES). As a result, it is possible to generate a stable tracking error signal (TES). Furthermore, since the magneto-optic signal (MO) is obtained from the difference of the output currents of the detectors 12 and 13, the problem of crosstalk will not occur, and it is possible to generate a magneto-optic signal (MO) having a high quality.

In addition, the Wollaston prism 9 used in this embodiment has a construction such that the optical axes showing the optical anisotropies of the optical crystals which are connected are non-perpendicular to each other. Hence, a total of 3 lights (light beams) are obtained from the Wollaston prism 9, where the 3 light beams are made up of 2 light beams having mutually perpendicular planes of polarization and mutually different progressing directions, and 1 light beam in which components of these 2 light beams coexist. As described above, this 1 light beam in which the components of the 2 light beams coexist is used to generate the focal error signal (FES) and the tracking error signal (TES). On the other hand, the 2 light beams having mutually perpendicular planes of polarization are used to generate the magneto-optic signal (MO).

Figure 7:
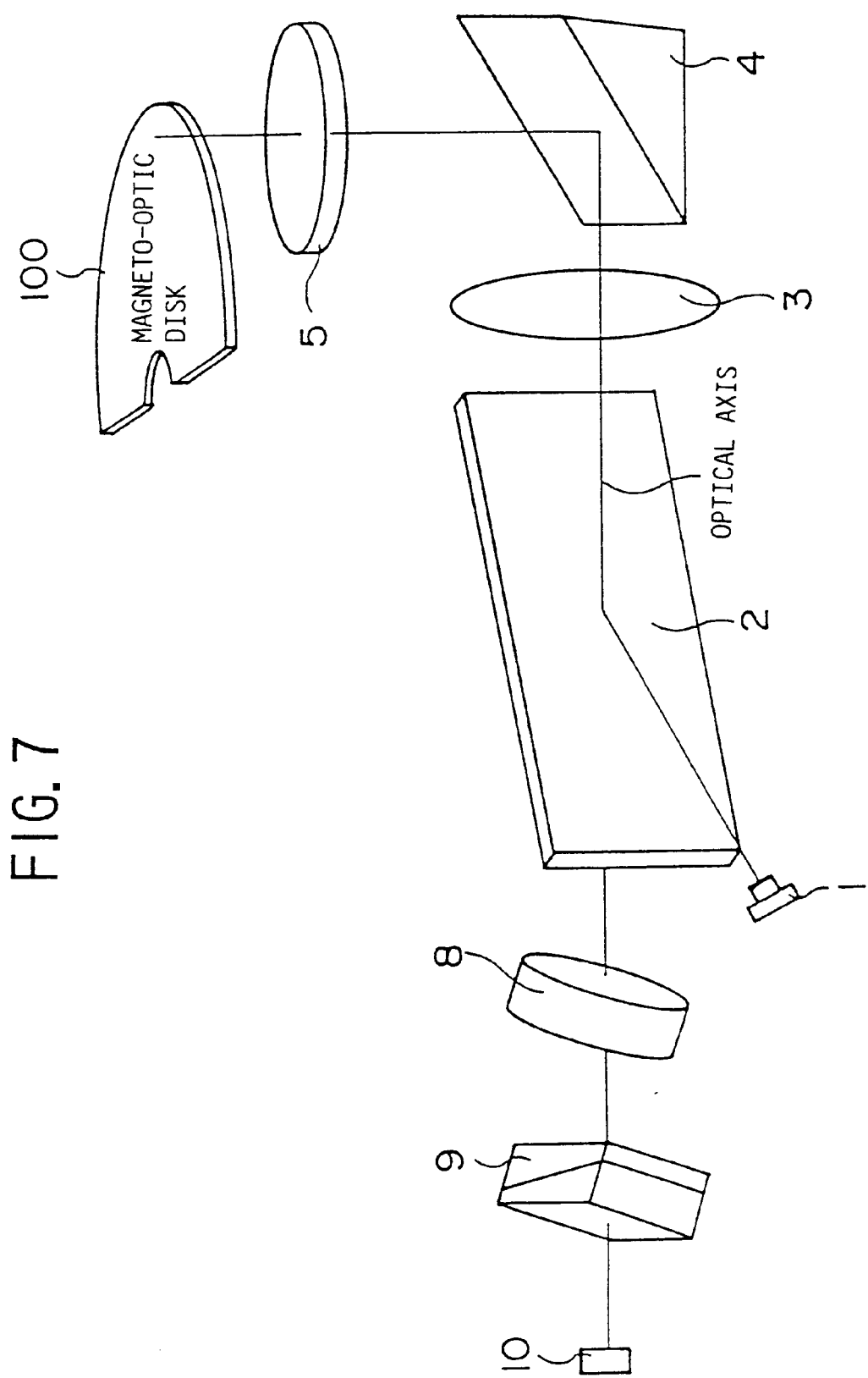
FIG. 7 is a perspective view showing the first embodiment of the optical information storage apparatus viewed from a 45° angle from above.

FIG. 7 is a perspective view showing the optical information storage apparatus shown in FIG. 5 viewed from a 45° angle from above. In FIG. 7, a magneto-optic disk 100 has the track 6 and the magnetic domain 7 described above.

In this embodiment, when generating a focal error signal (FES) according to the astigmatism method by irradiating on the track 6 formed on the recording surface of the magneto-optic disk 100 a light beam having an electric vector which is perpendicular or parallel to the track 6, it is possible to suppress the push-pull signal from mixing into the focal error signal (FES) as a crosstalk, because the division lines of the 4-part detector 11 is arranged parallel or perpendicular to the track 6. Therefore, it is possible to carry out stable focus servo and stable tracking servo. Furthermore, it is possible to generate a magneto-optic signal (MO) having a high quality. In other words, it is possible to realize a high-performance optical information storage apparatus by use of an optical system having a relatively simple and inexpensive construction.

Figure 8:
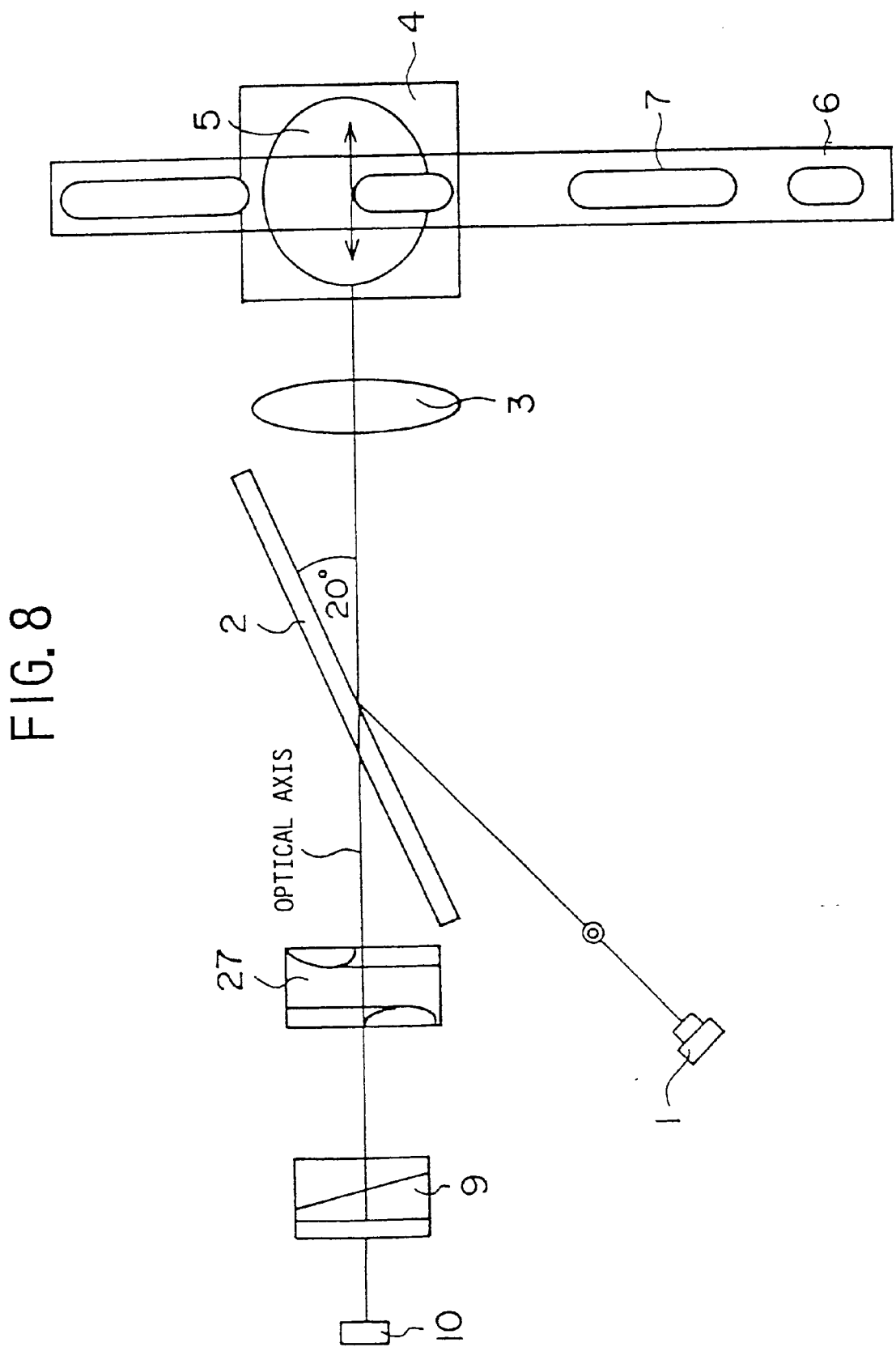
FIG. 8 is a plan view showing the general construction of an optical system of a second embodiment of the optical information storage apparatus according to the present invention.

FIG. 8 is a plan view showing the general construction of an optical system of a second embodiment of the optical information storage apparatus according to the present invention. In FIG. 8, those parts which are the same as those corresponding parts in FIGS. 5 and 7 are designated by the same reference numerals, and a description thereof will be omitted.

In this embodiment, a cylindrical lens 27 is used in place of the plano concave lens 8 shown in FIGS. 5 and 7, as shown in FIG. 8. This cylindrical lens 27 has two concave cylindrical surfaces, and edge lines of the two concave cylindrical surfaces are perpendicular to each other. In addition, the radii of curvature of the two concave cylindrical surfaces are mutually different. Accordingly, the functions and effects of the cylindrical lens 27 are similar to a case where a concave lens and a cylindrical lens are combined. In other words, it is possible to enlarge a least circle of confusion due to the astigmatism, thereby making it easy to adjust the photodetector 10, and to easily secure a space in which the Wollaston prism 9 is to be arranged.

Figure 9:
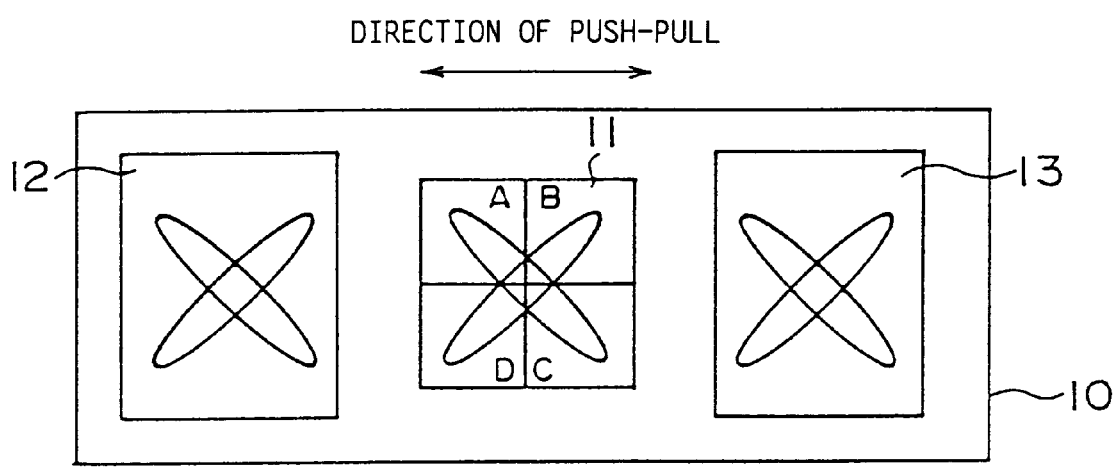
FIG. 9 is a plan view showing the general construction of a photodetector on an enlarge scale.

In addition, the edge lines of the cylindrical lens 27 are arranged to having a 45° inclination with respect to the paper in FIG. 8, and thus, it is possible to obtain effects similar to those obtainable in the first embodiment described above. FIG. 9 is a plan view showing the general construction of he photodetector 10 shown in FIG. 8 on an enlarge scale. In FIG. 9, those parts which are the same as those corresponding parts in FIG. 6 are designated by the same reference numerals, and a description thereof will be omitted.

Moreover, since the cylindrical lens 27 is arranged perpendicular with respect to the optical axis, no coma aberration is generated, and it is possible to obtain an extremely stable push-pull signal.

Figure 10:
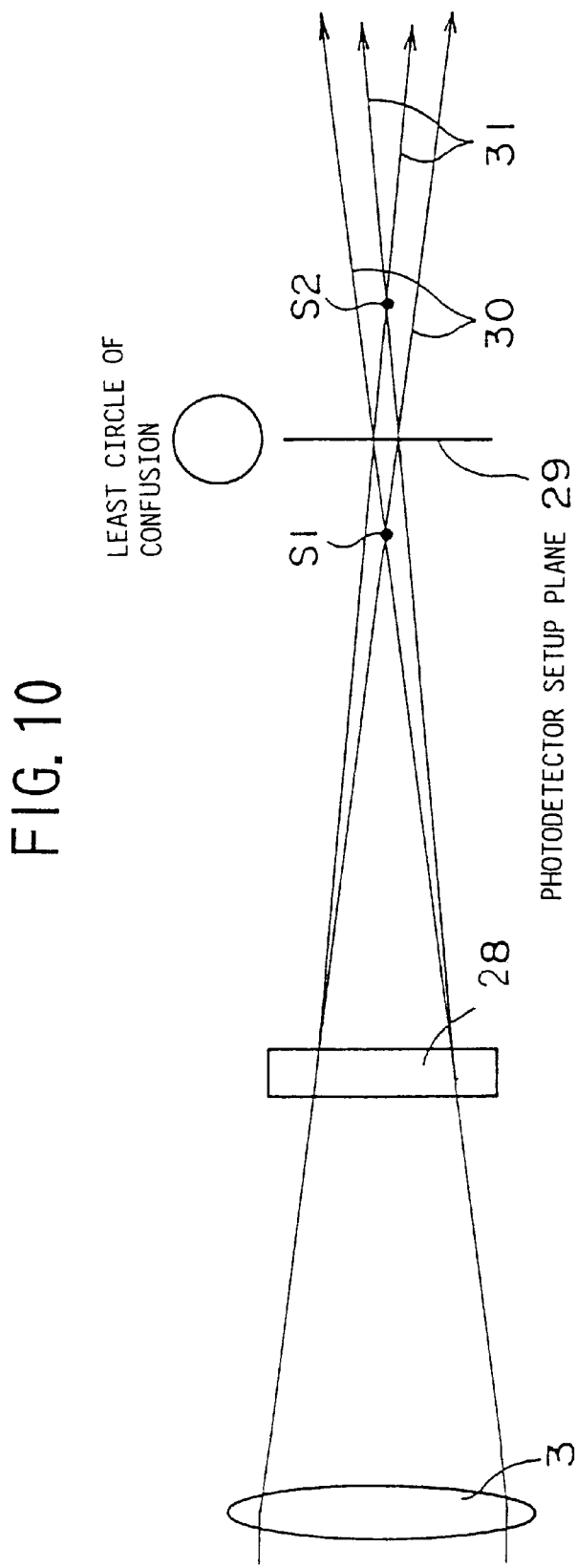
FIG. 10 is a diagram for explaining enlargement of a least circle of confusion and securing of a space for arranging a Wollaston prism.
Figure 11:
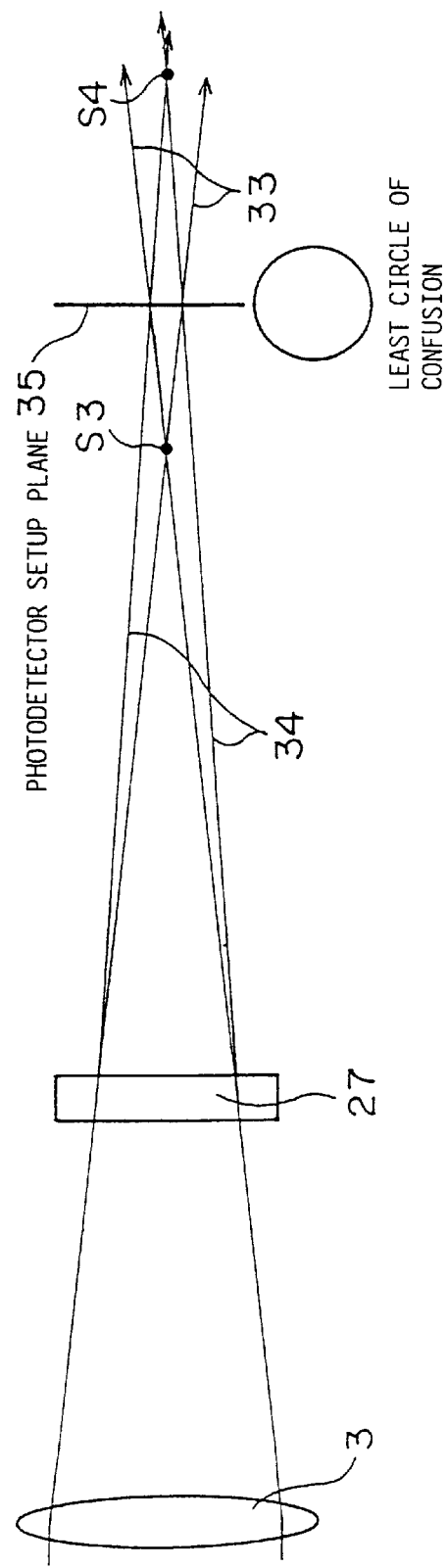
FIG. 11 is a diagram for explaining the enlargement of the least circle of confusion and the securing of the space for arranging the Wollaston prism.

Next, a description will be given of the enlargement of the least circle of confusion and the securing of the space for arranging the Wollaston prism 9, by referring to FIGS. 10 and 11. FIG. 10 is a diagram for explaining a case where a plano concave cylindrical lens 28 is used, and FIG. 11 is a diagram for explaining a case where the cylindrical lens 27 of the second embodiment having the concave cylindrical surfaces on both sides thereof is used. In FIGS. 10 and 11, the illustration of the plate-shaped polarization beam splitter 2 is omitted, because the astigmatisms are mutually cancelled due to the interactions of the plate-shaped polarization beam splitter 2 and the Wollaston prism 9.

In the case shown in FIG. 10, the reflected light from the magneto-optic disk 100 is transmitted through the collimator lens 3 and is converted into convergent light. This convergent light is input to the plano concave cylindrical lens 28, and the astigmatism is generated. The plano concave cylindrical lens 28 is arranged in a direction so that the edge line of the concave cylindrical surface provided on one side of the plano concave cylindrical lens 28 is parallel to the paper in FIG. 10, and for example, a convergent light (plane light) 30 on the paper is completely unaffected by the lens operation of the plano concave cylindrical lens 28. In other words, the incident angle and the reflection or output angle of the convergent light 30 with respect to the plano concave cylindrical lens 28 are the same. Accordingly, a convergent point S1 of the light is determined by the focal distance of the collimator lens 3 and the thickness of the plano concave cylindrical lens 28. On the other hand, the convergent light within the plane perpendicular to the paper and including the optical axis is affected by the lens operation of the plano concave cylindrical lens 28, and a convergent position shifts from the convergent point S1 to a convergent point S2 which is located farther away from the plano concave cylindrical lens 28 depending on the curvature of the concave cylindrical surface of the plano concave cylindrical lens 28.

In FIG. 10, the light viewed in a direction parallel to the paper is indicated as a convergent light 31. A position where the image height of the convergent light 30 becomes the same as that of the convergent light 31 corresponds to a position 29 where the so-called least circle of confusion appears, and the photodetector 10 is arranged at this position 29.

In the case shown in FIG. 11, the reflected light from the magneto-optic disk 100 is transmitted through the collimator lens 3 and is converted into a convergent light. This convergent light is input to the cylindrical lens 27, and the astigmatism is generated. The edge lines of the two concave cylindrical surfaces on both sides of the cylindrical lens 27 are perpendicular to each other, and the curvatures of the two concave cylindrical surfaces are mutually different. For the sake of convenience, it is assumed that the edge line of the concave cylindrical surface on the input side of the cylindrical lens 27 is parallel to the paper, and the edge line of the concave cylindrical surface on the output side of the cylindrical lens 27 is perpendicular to the paper. Furthermore, it is assumed for the sake of convenience that the radius of curvature of the concave cylindrical surface on the input side of the cylindrical lens 27 is smaller than that of the concave cylindrical surface on the output side of the cylindrical lens 27.

Since the cylindrical lens 27 is arranged as described above, a convergent light (plane light) 33 on the paper, for example, is completely unaffected by the lens operation of the input side of the cylindrical lens 27. However, because the edge line of the concave cylindrical surface on the output side of the cylindrical lens 27 is perpendicular to the paper, the convergent light 33 is affected by the lens operation of the output side of the cylindrical lens 27, and a convergent point S3 is located at a position farther away from the cylindrical lens 27 than the convergent position which is determined by the focal distance of the collimator lens 3 and the thickness of the cylindrical lens 27. On the other hand, the convergent light within the plane perpendicular to the paper and including the optical axis is affected by the lens operation of the input side of the cylindrical lens 27, but is unaffected by the lens operation of the output side of the cylindrical lens 27.

Because the radius of curvature of the concave cylindrical surface on the input side of the cylindrical lens 27 is smaller than that of the concave cylindrical surface on the output side of the cylindrical lens 27, the convergent position of the convergent light within the plane perpendicular to the paper and including the optical axis shifts to a convergent point S4 which is farther away from the cylindrical lens 27 than the convergent point S3, although it depend upon the thickness of the cylindrical lens 27.

In FIG. 11, the light viewed in a direction parallel to the paper is indicated as a convergent light 34. A position where the image height of the convergent light 33 becomes the same as that of the convergent light 34 corresponds to a position 35 where the so-called least circle of confusion appears, and the photodetector 10 is arranged at this position 35.

In each of the embodiments described above, the magneto-optic disk is used as the recording medium, but the present invention is of course similarly applicable to other magneto-optic recording mediums.

Further, the present invention is not limited to these embodiments, but various variations and modifications may be made without departing from the scope of the present invention.

What is claimed is:

1. An optical information storage apparatus comprising:
    a light source;
    a polarization beam splitter reflecting light emitted from said light source and irradiating a reflected light on a recording surface of a recording medium;
    a Wollaston prism, made of an optically transparent material, having an input surface to which light reflected by the recording surface and transmitted through said polarization beam splitter is input, and an output surface from which light is output, said Wollaston prism being inclined within a plane which is perpendicular to a light incident surface of said polarization beam splitter and includes an optical axis along which light travels, said input surface and said output surface of said Wollaston prism being parallel to each other; and
    a cylindrical lens arranged between said polarization beam splitter and said Wollaston prism and having at least one cylindrical surface,
        said cylindrical lens having an edge line which is inclined by 45° with respect to the light incident surface of said polarization beam splitter.

2. An optical information storage apparatus comprising:
    a light source;

a polarization beam splitter reflecting light emitted from said light source and irradiating a reflected light on a recording surface of a recording medium;

a Wollaston prism, made of an optically transparent material, having an input surface to which light reflected by the recording surface and transmitted through said polarization beam splitter is input, and an output surface from which light is output, said Wollaston prism being inclined within a plane which is perpendicular to a light incident surface of said polarization beam splitter and includes an optical axis along which light travels, said input surface and said output surface of said Wollaston prism being parallel to each other; and a cylindrical lens arranged between said polarization beam splitter and said Wollaston prism and having at least one cylindrical surface, said cylindrical lens having an edge line which is inclined by 45° with respect to the light incident surface of said polarization beam splitter, said Wollaston prism comprising a pair of optical crystals which are connected, and optical axes indicating optical anisotropies of said optical crystals are non-perpendicular to each other.

3. The optical information storage apparatus as claimed in claim 1, wherein said cylindrical lens has two concave cylindrical surfaces with two edge lines which are perpendicular to each other, and each of said edge lines are inclined by 45° with respect to the light incident surface of said polarization beam splitter.

4. The optical information storage apparatus as claimed in claim 2, wherein said cylindrical lens has two concave cylindrical surfaces with two edge lines which are perpendicular to each other, and each of said edge lines are inclined by 45° with respect to the light incident surface of said polarization beam splitter.

5. The optical information storage apparatus as claimed in claim 4, wherein the two concave cylindrical surfaces of said cylindrical lens have mutually different radii of curvature.

6. The optical information storage apparatus as claimed in claim 5, wherein the two concave cylindrical surfaces of said cylindrical lens have mutually different radii of curvature.

* * * * *

UNITED STATES PATENT AND TRADEMARK OFFICE
CERTIFICATE OF CORRECTION

PATENT NO. : 6,091,692　　　　　　　　　　　　　　　　　　　　Page 1 of 1
DATED : July 18, 2000
INVENTOR(S) : Morimoto It is certified that error appears in the above-identified patent and that said Letters Patent is hereby corrected as shown below:

<u>Column 10,</u>
Line 19, please delete "claim 5" and insert -- claim 3 -- therefor.

Signed and Sealed this

Eighteenth Day of December, 2001

Attest:

JAMES E. ROGAN
*Attesting Officer*　　　*Director of the United States Patent and Trademark Office*